(12) United States Patent
Appelman et al.

(10) Patent No.: US 11,512,975 B2
(45) Date of Patent: Nov. 29, 2022

(54) METHOD OF NAVIGATING AN UNMANNED VEHICLE AND SYSTEM THEREOF

(71) Applicant: ELTA SYSTEMS LTD., Ashdod (IL)

(72) Inventors: Dina Appelman, Bat-Yam (IL); Ofir Cohen, Tzelafon (IL)

(73) Assignee: ELTA SYSTEMS LTD., Ashdod (IL)

( * ) Notice: Subject to any disclaimer, the term of this patent is extended or adjusted under 35 U.S.C. 154(b) by 190 days.

(21) Appl. No.: 16/482,625

(22) PCT Filed: Feb. 22, 2018

(86) PCT No.: PCT/IL2018/050208
§ 371 (c)(1),
(2) Date: Jul. 31, 2019

(87) PCT Pub. No.: WO2018/154579
PCT Pub. Date: Aug. 30, 2018

(65) Prior Publication Data
US 2020/0033155 A1    Jan. 30, 2020

(30) Foreign Application Priority Data
Feb. 23, 2017    (IL) .......................................... 250762

(51) Int. Cl.
*G01S 19/47*        (2010.01)
*G06V 20/58*        (2022.01)
(Continued)

(52) U.S. Cl.
CPC .......... *G01C 21/3667* (2013.01); *G01S 19/47* (2013.01); *G05D 1/0088* (2013.01);
(Continued)

(58) Field of Classification Search
CPC ....... G01C 21/3667; G05D 2201/0213; G05D 1/0223; G05D 1/0088; G06K 9/00805; G01S 19/47
See application file for complete search history.

(56) References Cited

U.S. PATENT DOCUMENTS

| 5,677,836 A | 10/1997 | Bauer |
| 6,037,893 A | 3/2000 | Lipman |

(Continued)

FOREIGN PATENT DOCUMENTS

| CN | 103455034 A | 12/2013 |
| CN | 104501794 A | 4/2015 |

(Continued)

OTHER PUBLICATIONS

Lee, Jae-Yong et al., "Consecutive Scanning based Obstacle Detection and Probabilistic Navigation of a Mobile Robot", Proceedings of the 2003 IEEE/RSJ Intl. Conference on Intelligent Robots and Systems Las Vegas, NV, Oct. 2003, pp. 3510-3515.

(Continued)

*Primary Examiner* — Mathew Franklin Gordon
(74) *Attorney, Agent, or Firm* — Dorsey & Whitney LLP

(57) ABSTRACT

The presently disclosed subject matter includes a system and a method of navigating an unmanned ground vehicle (UGV) vehicle comprising a scanning device and an Inertial Navigation System (INS) being operatively connected to at least one processor. Operating the scanning device for scanning an area surrounding the UGV, and generate scanning output data; Generating, based on the scanning output data, a map representing at least a part of the area, the map being relative to a location of the UGV and comprising cells, each cell is classified to a class selected from at least two classes, comprising traversable and non-traversable, and characterized by dimensions larger than an accumulated drift value of the INS over a predefined distance; receiving INS data (Continued)

indicative of a current location of the UGV and updating a location of the UGV relative to cells in the map based on the INS data.

36 Claims, 4 Drawing Sheets

(51) Int. Cl.
*G01C 21/36* (2006.01)
*G05D 1/02* (2020.01)
*G05D 1/00* (2006.01)

(52) U.S. Cl.
CPC .......... *G05D 1/0223* (2013.01); *G06V 20/58* (2022.01); *G05D 2201/0213* (2013.01)

(56) References Cited

U.S. PATENT DOCUMENTS

| | | |
|---|---|---|
| 6,477,465 B1 | 11/2002 | Mccall et al. |
| 7,272,474 B1 | 9/2007 | Stentz et al. |
| 7,584,020 B2 | 9/2009 | Bruemmer et al. |
| 7,756,615 B2 | 7/2010 | Barfoot et al. |
| 8,364,334 B2 | 1/2013 | Au et al. |
| 8,649,930 B2 | 2/2014 | Reeve et al. |
| 9,234,618 B1 * | 1/2016 | Zhu .................... G01S 7/497 |
| 11,023,847 B2 * | 6/2021 | Skaaksrud ........... G05D 1/0088 |
| 2006/0190163 A1 | 8/2006 | Anderson |
| 2007/0005306 A1 | 1/2007 | Foessel |
| 2007/0193798 A1 * | 8/2007 | Allard .................. G05D 1/0061 180/169 |
| 2008/0059015 A1 | 3/2008 | Whittaker et al. |
| 2010/0066587 A1 | 3/2010 | Yamauchi et al. |
| 2011/0178668 A1 | 7/2011 | Tanaka et al. |
| 2017/0299397 A1 | 10/2017 | Ichikawa et al. |
| 2020/0159227 A1 | 5/2020 | Cohen et al. |
| 2021/0025143 A1 | 1/2021 | Cohen et al. |

FOREIGN PATENT DOCUMENTS

| | | |
|---|---|---|
| CN | 104777499 A | 7/2015 |
| CN | 110567884 A | 12/2019 |
| DE | 19904097 B4 | 6/2006 |
| EP | 2338029 A4 | 7/2012 |
| EP | 2203718 B1 | 3/2014 |
| KR | 101772977 B1 | 8/2017 |
| WO | 2009053406 A1 | 4/2009 |
| WO | 2016165704 A2 | 10/2016 |
| WO | 2018176472 A1 | 10/2018 |

OTHER PUBLICATIONS

Procopio, Michael et al., "Learning Terrain Segmentation with Classifier Ensembles for Autonomous Robot Navigation in Unstructured Environments", Journal of Field Robotics; vol. 26 No. 2, 2009, pp. 145-175.

Ribo, Miguel et al., "A comparison of three uncertainty calculi for building sonar-based occupancy grids", Robotics and Autonomous Systems; vol. 35, 2001, pp. 201-209.

* cited by examiner

METHOD OF NAVIGATING AN UNMANNED VEHICLE AND SYSTEM THEREOF

TECHNICAL FIELD

The presently disclosed subject matter relates to unmanned vehicles, and more particularly, to navigation of unmanned vehicles.

BACKGROUND

An unmanned ground vehicle (UGV), also referred to as an uncrewed vehicle is a motorized machine that travels by integrating sensory data with computer-based decision making for the purpose of autonomously driving the vehicle. The vehicle can in some cases carry passengers, e.g. operators that cannot see the surrounding environment and/or maneuver the vehicle.

One issue related to UGV operation is autonomous navigation. When navigating the vehicle, information with respect to obstacles which are located within the traversed area is used for determining a route that avoids the obstacles to enable safe travel of the vehicle through the area. An obstacle can be any area or object which should be avoided. For example, an obstacle can be an object or area which either blocks or endangers the vehicle, e.g. slopes, holes in the ground, water reservoirs, walls, big rocks, overhead obstacles e.g., bridges, etc. Obstacles can also include any area which is desired to be avoided (e.g. noxious areas, habitat areas which should be avoided for ecological or animal conservation reasons, populated areas which should be avoided for safety reasons, etc.).

General Description

The disclosure relates to navigation of a UGV within an area, in the presence of obstacles. Tracking the UGV with a GPS may be insufficiently accurate and suffer from discontinuities which can lead to collisions with obstacles or entering non-traversable areas. Other techniques may use an Inertial Navigation System (INS) which calculates the position of the UGV based on readings received from an Inertial Measurement Unit (IMU). However, such tracking may result in significant errors due to integration drift which accumulates as the UGV advances.

According to some examples of the disclosed subject matter, the UGV is tracked using a map of the environment. The map can be generated and repeatedly updated by scanning the area surrounding the UGV using one or more scanning devices operated from onboard the UGV. The resulting map is thus generated relative to the UGV (sometimes referred to herein as a "relative map"), e.g. the map represents an area surrounding the UGV. In some examples the map may be centered around the UGV.

In addition to avoiding obstacles, the UGV may receive or determine a destination or a path from a current location to a target location. The UGV can advance using the generated map, in accordance with the path, and its location is tracked (including between successive updates of the map performed based on readings received from the scanning device) based on readings received from an INS. Updating the relative location between the UGV and an obstacle that was detected in a previous scan but is not seen in a current scan can also be performed in accordance with advancement of the UGV, based on INS data.

As mentioned above, INS suffers from an accumulating drift that renders INS position determination severely unreliable over time. The presently disclosed subject matter includes a method of mapping an area and navigating the UGV within the mapped area using INS while overcoming the problem of INS drift.

The map can comprise a grid of cells, wherein each cell represents part of the mapped area. According to examples of the presently disclosed subject matter, the size of the cells is selected to be larger than the maximal INS drift over a certain predefined traversed distance, when calculating locations, based on INS readings.

Thus, while advancing towards the target location, possibly along a predefined path leading thereto, the UGV navigates through the traversed area and avoids obstacles by repeatedly scanning the area surrounding the UGV, generating a relative map of the area based upon the scanning output data, and using an INS for updating the location of the UGV and navigating the UGV according to the mapping data.

One aspect of the disclosed subject matter relates to a method of navigating an unmanned ground vehicle (UGV), the vehicle comprising a scanning device and an Inertial Navigation System (INS) being operatively connected to a computer, the method comprising: operating the scanning device for scanning an area surrounding the vehicle, the area having known dimensions, to thereby generate respective scanning output data; operating the computer for generating, based on the scanning output data, a map representing at least a part of the area, the map being relative to a location of the UGV vehicle, wherein the map comprises cells, each cell being classified to a class selected from at least two classes, comprising traversable and non-traversable, and characterized by dimensions larger than an accumulated drift value of the INS over a predefined distance; receiving INS data and updating a location of the UGV relative to the cells based on the INS data.

In addition to the above features, the method according to this aspect of the presently disclosed subject matter can optionally comprise one or more of features (i) to (xx) listed below, in any technically possible combination or permutation:

i). Controlling the vehicle movement within the area based on the map, to thereby avoid non-traversable cells.

ii). Wherein INS data is received repeatedly.

iii). Wherein the map is initially generated by accumulating scanning output data to map the area as the UGV advances into the area.

iv). Wherein the map is generated by accumulating scanning output data in an advancement direction of the UGV as the UGV advances into the area, and omitting representation of areas in an opposite direction beyond a scanning range.

v). Repeatedly obtaining a path to a destination of the UGV; and updating the path using the map.

vi). Determining the path to the destination, the path determined so as to avoid non-traversable cells.

vii). Wherein the path is determined so as to avoid dangerous slopes.

viii). Receiving a current location of the UGV and a destination location in absolute coordinates, wherein the path is determined based on the current location and the destination location.

ix). Identifying the destination location based on a predetermined mark, wherein the path is determined from a current location to the destination location.

x). Providing steering instructions to control the UGV in accordance with the path.

xi). Displaying a representation of the map including non-traversable cells, an indication of a location of the UGV, and the path.

xii). Wherein the predefined distance is selected to exceed a maximal distance expected to be traveled by the UGV between consecutive map updates.

xiii). Wherein the predefined distance is equal to a dimension of the area represented by the map.

xiv). Wherein the predefined distance is equal to half of a dimension of the part of the area represented by the map.

xv). Wherein the predefined distance is determined in accordance with a relation between an update rate of the map, and a maximal or expected velocity of the UGV.

xvi). Wherein the area dimensions are determined in accordance with a scanning distance of the scanning device.

xvii). Wherein the area is a square having an edge of up to double the scanning distance of the scanning device.

xviii). wherein operating the scanning device includes repeatedly executing a scanning operation, the scanning operation comprises the scanning of the area surrounding the UGV.

xix). Wherein an obstacle detected during a scanning operation and indicated on the map as a non-traversable cell and not detected in at least one subsequent scans, is indicated on at least one further map update as a non-traversable cell.

xx). Wherein the cell dimensions are determined in accordance with the dimension of the area squared, divided by a velocity of the UGV and multiplied by the drift value of the INS.

According to another aspect of the presently disclosed subject matter there is provided a system mountable on an unmanned ground vehicle (UGV), comprising: a scanning device for scanning an area surrounding the UGV, to thereby provide scanning output data providing information about distances between objects in the area and the UGV in a multiplicity of directions;

an INS for providing data indicative of a current location of the UGV relative to a previous location; and at least one processor;

the scanning device is operable to scan an area surrounding the UGV, to thereby generate respective scanning output data;

the at least one processor is configured to:

generate, based on the scanning output data, a map representing at least a part of the area, the map being relative to a location of the UGV, wherein the map comprises cells, each cell is classified to a class selected from the group consisting of traversable and non-traversable, and characterized by dimensions larger than an accumulated drift value of the INS over a predefined distance;

receive INS data and update a location of the UGV relative to the cells based on the INS data.

According to another aspect of the presently disclosed subject matter there is provide an unmanned ground vehicle (UGV), comprising:

a scanning device for scanning an area surrounding the UGV, to thereby provide scanning output data providing information about distances between objects in the area and the UGV in a multiplicity of directions;

an INS for providing data indicative of a current location of the UGV relative to a previous location;

a vehicle control sub-system configured to receive vehicle control instructions and control the UGV in accordance with the instructions; and at least one processor configured to:

operate the scanning device for scanning an area surrounding the vehicle, the area having a predefined area dimensions, to thereby generate respective scanning output data;

based on the scanning output data, a map representing at least a part of the area, the map being relative to a location of the UGV, wherein the map comprises cells, each cell is classified to a class selected from the group consisting of traversable and non-traversable, and characterized by dimensions larger than an accumulated drift value of the INS over a predefined distance;

receive INS data and update a location of the UGV relative to the cells based on the received INS data.

According to yet another aspect of the presently disclosed subject matter there is provided a computer program product comprising a computer readable storage medium retaining program instructions, which program instructions when read by a processor, cause the processor to perform a method of navigation a vehicle, comprising:

receiving scanning output data, generated by a scanning device located on-board the vehicle and operable to scan an area surrounding the vehicle;

using the scanning output data for generating respective mapping data representing at least a part of the area, the mapping data being relative to a location of the vehicle, wherein the mapping data comprises cells, each cell is classified to a class selected from at least two classes, comprising traversable and non-traversable, and characterized by dimensions larger than an accumulated drift value of an INS over a predefined distance;

receiving INS data indicative of a current location of the vehicle relative to a previous location; and for each INS data received, updating a location of the vehicle relative to the cells.

The UGV, the system and the computer program products disclosed in accordance with the presently disclosed subject matter can optionally comprise one or more of features (i) to (xx) listed above, mutatis mutandis, in any desired combination or permutation.

According to another aspect of the disclosed subject matter relates to a method of navigating an unmanned ground vehicle (UGV), the vehicle comprising a scanning device and an Inertial Navigation System (INS) being operatively connected to a computer, the method comprising: repeatedly operating the scanning device for executing a scanning operation, comprising scanning an area surrounding the vehicle, the area having predefined area dimensions, to thereby generate respective scanning output data; operating the computer for generating, based on the scanning output data, a map representing at least a part of the area, the map being relative to a location of the UGV vehicle, wherein the map comprises cells, each cell being classified to a class selected from at least two classes, comprising traversable and non-traversable, and characterized by dimensions larger than an accumulated drift value of the INS over a predefined distance; receiving INS data indicative of a current location of the UGV relative to a previous location; and based on the received INS data, updating a location of the UGV relative to at least non-traversable cells.

According to another aspect of the presently disclosed subject matter there is provided an unmanned ground vehicle (UGV), comprising a scanning device for scanning an area surrounding the UGV, the area having at least predefined area dimensions, to thereby provide scanning output data providing information about distances between objects in the area and the UGV in a multiplicity of directions; an INS for providing data indicative of a current location of the UGV relative to a previous location; a vehicle control sub-system configured to receive vehicle control instructions and control the UGV in accordance with the instructions; a computer configured to repeatedly operate the scanning device for executing a scanning operation, comprising scanning an area surrounding the vehicle, to thereby generate respective scanning output data; operate the computer for generating, based on the scanning output data, a map representing at least a part of the area, the map being relative to a location of the UGV vehicle, wherein the map comprises cells, each cell being classified to a class selected from the group consisting of traversable and non-traversable, and characterized by dimensions larger than an accumulated drift value of the INS over a predefined distance; receive INS data indicative of a current location of the UGV relative to a previous location; and based on the received INS data, update a location of the UGV relative to non-traversable cells.

According to another aspect of the presently disclosed subject matter there is provided a system mountable on an unmanned ground vehicle (UGV), comprising: a scanning device for scanning an area surrounding the UGV, the area having at least predefined area dimensions, to thereby provide scanning output data providing information about distances between objects in the area and the UGV in a multiplicity of directions; an INS for providing data indicative of a current location of the UGV relative to a previous location; a computer configured to repeatedly operate the scanning device for executing a scanning operation, comprising scanning an area surrounding the vehicle, the area having a predefined area dimensions, to thereby generate respective scanning output data; operate the computer for generating, based on the scanning output data, a map representing at least a part of the area, the map being relative to a location of the UGV vehicle, wherein the map comprises cells, each cell being classified to a class selected from the group consisting of traversable and non-traversable, and characterized by dimensions larger than an accumulated drift value of the INS over a predefined distance; receive INS data indicative of a current location of the UGV relative to a previous location; and based on received INS data, update a location of the UGV relative to non-traversable cells.

According to another aspect of the presently disclosed subject matter there is provided a computer program product comprising a computer readable storage medium retaining program instructions, which program instructions when read by a computer, and cause the computer to perform a method comprising repeatedly operating a scanning device of a UGV for executing a scanning operation, comprising scanning an area surrounding the UGV, the area having predefined area dimensions, to thereby generate respective scanning output data; operating a computer for generating, based on the scanning output data, a map representing at least a part of the area, the map being relative to a location of the UGV vehicle, wherein the map comprises cells, each cell being classified to a class selected from at least two classes, comprising traversable and non-traversable, and characterized by dimensions larger than an accumulated drift value of an INS over a predefined distance; receiving INS data indicative of a current location of the UGV relative to a previous location; and for each INS data received, updating a location of the UGV relative to non-traversable cells.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1:
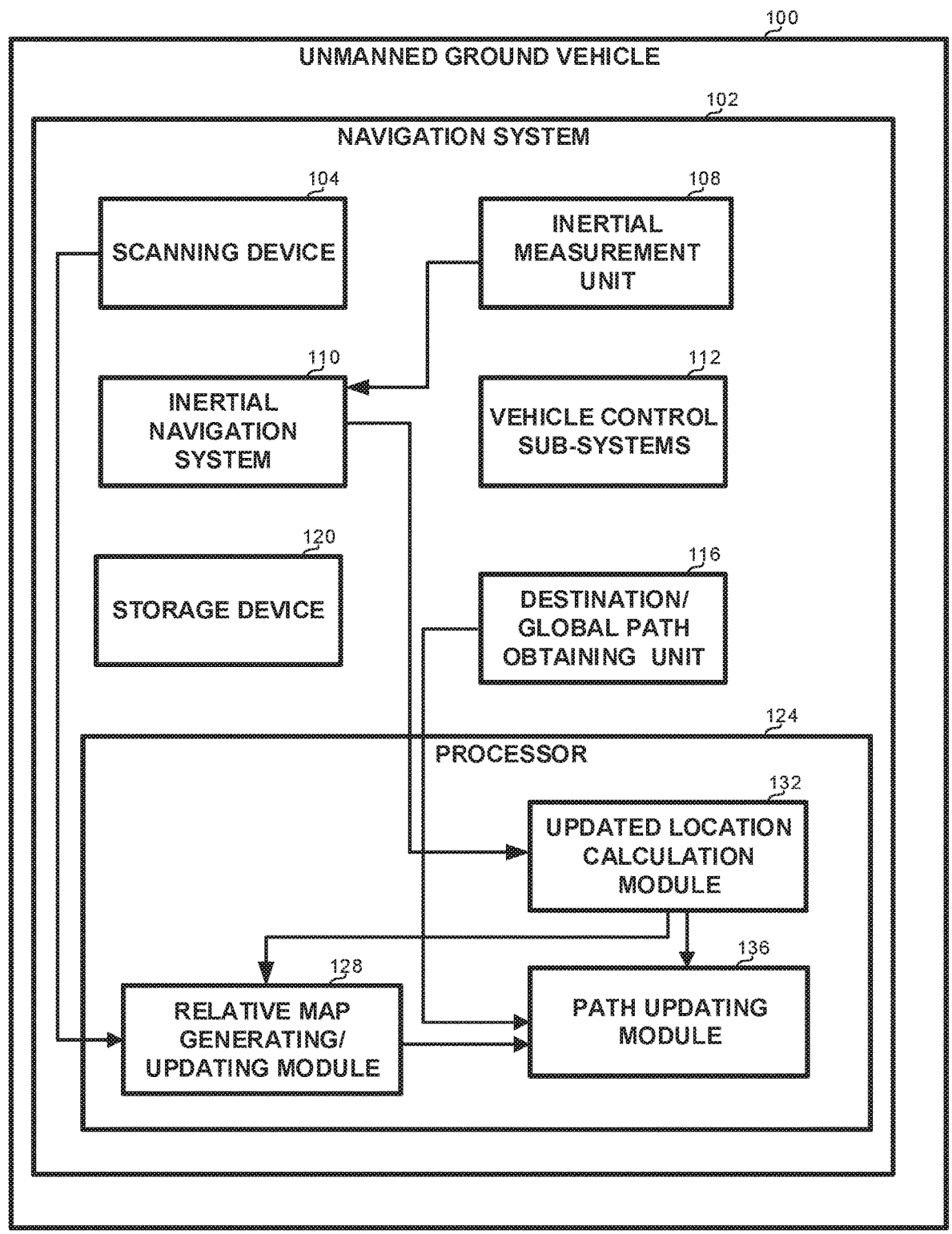
FIG. 1 illustrates a schematic block diagram of a navigation system of a UGV, in accordance with certain examples of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "determining", "representing", "comparing", "generating", "assessing", "matching", "updating", "creating" or the like, refer to the action(s) and/or process (es) of a computer that manipulate and/or transform data into other data, said data represented as physical, such as electronic, quantities and/or said data representing the physical objects.

The terms "computer", "processing unit", "processor", or the like should be expansively construed to include any kind of electronic hardware device with data processing circuitry, which includes a computer processor as disclosed herein below (e.g., a Central Processing Unit (CPU), a microprocessor, an electronic circuit, an Integrated Circuit (IC), firmware written for or ported to a specific processor such as digital signal processor (DSP), a microcontroller, a field programmable gate array (FPGA), an application specific integrated circuit (ASIC), etc.) and capable of executing computer instructions (e.g. loaded on a computer memory).

The operations in accordance with the teachings herein may be performed by a computer specially constructed for the desired purposes or by a general-purpose computer specially configured for the desired purpose by a computer program stored in a computer readable storage medium. In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter.

The term "scanning device" as used herein should be expansively construed to include any kind of device configured to identify that an object is present at a specific distance and at a specific direction relative to the device. Examples of scanning devices include, but are not limited to: laser scanners (including LIDAR), RADAR, images sensor, sonar, etc. A scanning device can scan for example, 360° on a plane surrounding the device, or at some other smaller scanning angle (e.g. 180°). Alternatively, the scanning device can scan a sphere or part thereof around the UGV. A scanning device can provide information for generating a 3 dimensional map of the scanned area. In some embodiments, in order to save resources, a 2.5 dimensional map may be generated, as detailed below.

The term "unmanned ground vehicle" (UGV) as used herein should be expansively construed to include any kind of vehicle that can be operated either autonomously, by a tele-operator, or by an on-board driver who cannot see the environment and steers in accordance with a map or with explicit steering instructions. A UGV in accordance with the description is equipped with a scanning device configured to scan the area surrounding the UGV, and an INS configured to provide positioning data of the UGV.

The term "map" as used herein should be expansively construed to include any data structure representing a geographical area. A map may be absolute, i.e., comprise indications of absolute coordinates of an object or a location, or relative, i.e., comprise information about locations or objects, regardless of their locations in absolute coordinates. A map may be represented on a computerized display device, paper or any other tangible medium. In some embodiments of the disclosure, a 2.5 dimensional map may be generated and used. A 2.5 dimensional map relates to a map which indicates the lowest height of an obstacle above the ground, i.e., the vertical distance between the ground and the obstacle at each ground location. In other words, there is provided for each ground location, the height of the free space above the ground. Thus, the information in the map indicates for each location the clearance height for the UGV. For example the lowest height of a treetop or a bridge at a certain point. It will be appreciated that for obstacles that are on the ground, such as a house or a trunk of a tree, this height may be indicated as zero. Thus, for path planning purposes, the clearance height may be taken into account, when determining, for example, whether the UGV can pass under a tree or a bridge.

Reference is now made to FIG. 1, showing a schematic block diagram of a navigation system of a UGV, in accordance with some examples of the presently disclosed subject matter.

UGV 100 comprises navigation system 102. It will be appreciated that navigation system 102 can comprise components, some of which may also serve other purposes, and that components of navigation system 102 may be located at different places on UGV 100. Further, navigation system 102 can also receive services from and communicate with other components of UGV 100.

Navigation system 102 can comprise or be otherwise operatively connected to a scanning device 104 configured to scan an area surrounding the vehicle, and provide scanning output data for generating a relative map as further described below.

Navigation system 102 can further comprise or be otherwise operatively connected to IMU 108 providing acceleration data of the UGV, and INS 110 tracking the position, velocity, and orientation of an object based on the IMU output data. In some examples, INS 110 comprises IMU 108 to form a self-contained navigation system which uses measurements provided by IMU 108 to track the position, velocity, and orientation of an object relative to a starting position, orientation, and velocity.

Navigation system 102 can further comprise or be otherwise operatively connected to vehicle control sub-systems 112 including for example steering control unit, gear control unit, throttle control unit, etc. Vehicle control sub-systems 112 can be configured in some examples to receive vehicle control instructions (e.g., steering commands) and control UGV 100 accordingly. The instructions may be absolute or relative, for example an absolute instruction may be "go 20 m north", while a relative instruction may be "continue straight for 20 m" or "gas 30%, yaw rate 50%".

Navigation system 102 can further comprise destination and path determination unit 116 (implemented for example as a dedicated processing unit or being otherwise operatively connected to a processing unit) for obtaining a destination to which UGV 100 has to arrive and calculating a path to that destination, or obtaining, for example receiving, a path leading to a destination. A path may be provided as a series of way points leading from a current location of UGV 100 to a target location. Destination and path determination unit 116 can comprise or utilize one or more of components such as but not limited to: a Global Positioning System (GPS); communication unit for receiving a location or instructions from an external source; camera and a computerized vision system for capturing images of the environment and identifying in the images a predetermined sign indicating a target destination. The indication can include for example visible or invisible light or a predetermined gesture performed by a person or a machine, or the like.

UGV 100 can further comprise computer data storage device 120 for storing information such as one or more maps, information about obstacles, navigation instructions, or the like.

Navigation system 102 can further comprise or be otherwise operatively connected to one or more processing units for controlling and executing various operations, as disclosed herein. Each processing unit comprises a respective processing circuitry comprising at least one computer processor which can be operatively connected to a computer-readable storage device having computer instructions stored thereon to be executed by the computer processor.

According to one example, different functional elements (units, modules) in navigation system 102 can be implemented as a dedicated processing unit comprising dedicated computer processor and computer storage for executing specific operations.

Additionally or alternatively, one or more elements can be operatively connected to a common processing unit configured to execute operations according to instructions stored in the functional elements.

For example, UGV 100 can comprise processor 124 (e.g. in a computer or processing unit) which can be configured to execute several functional modules in accordance with computer-readable instructions stored on a non-transitory computer-readable medium operatively connected to processor 124, such as memory device 120. For illustrative purposes such functional modules are referred to hereinafter as comprised in the processor. Notably, in some examples at least part of the processing can be performed by a computer located remotely from the UGV and configured to receive input data from the UGV and provide to the UGV the processing output over a communication link.

Navigation system 102 can comprise by way of example relative map generation and updating module 128, updated location calculation module 132, and path updating module 136.

Updated location calculation module 132 is configured to update the location of UGV 100 on the latest available relative map, based on data, such as change in the location of UGV 100, as determined by INS 110. The location may be relative to a previous location, for example 20m in a specific direction, and is thus useful in assessing the updated location of UGV 100 on the map, relative to the non-traversable cells in the map.

Relative map generation and updating module 128 is configured to receive readings from scanning device 104 and from updated location calculation module 132, and generate or update a relative map of the UGV surroundings as disclosed further below.

Path updating module 136 is configured to update a path obtained by destination/global path obtaining unit 116, based on the relative map generated by map generation or updating module 128, such that the updated path avoids the obstacles.

Figure 2:
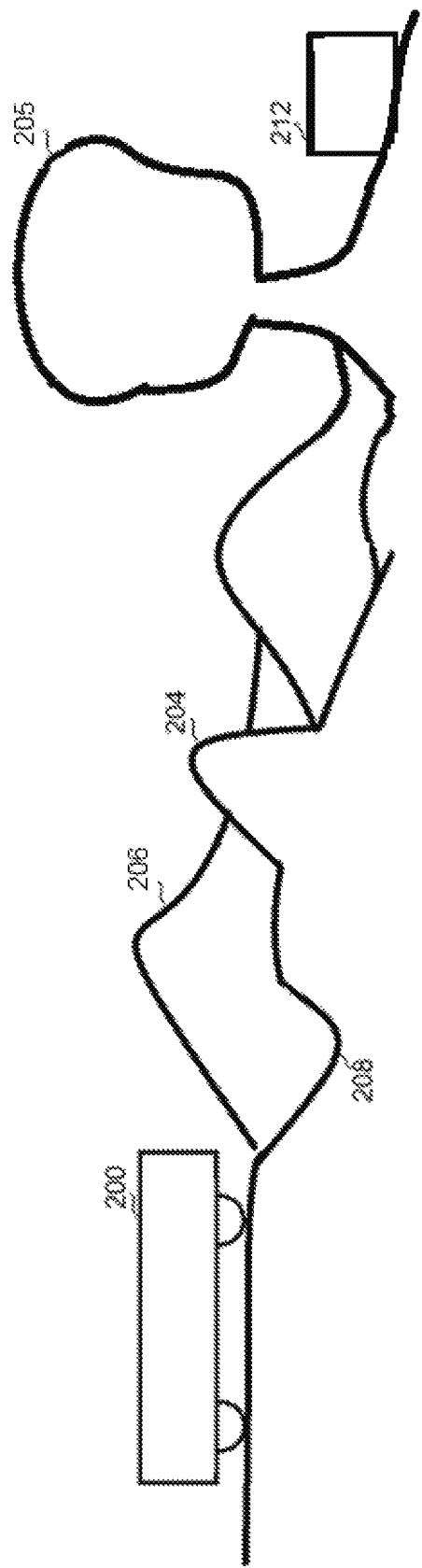
FIG. 2 shows a schematic illustration of an environment in which a UGV has to navigate.

FIG. 2 shows a schematic illustration of an example of an environment in which UGV 200 has to navigate from a current location to target location 212. The environment may comprise obstacles such as positive obstacle 204, which is above ground level, or negative obstacle 208 which is below ground level, overhead obstacle 205 such as a tree or a bridge, steep terrain 206 which may be for example a back, side or front slope, wherein all obstacles are non-traversable for UGV 200 and have to be avoided. It will be appreciated that some objects present an obstacle when accessed from one side, but not when accessed from another side. For example, a ramp may present an obstacle when accessed from the side, but not when accessed from the front or back.

Methods for navigating within an area in the presence of obstacles include generating a map of the area comprising indications of obstacles and optionally a target location or destination. Navigation further comprises tracking the location of the UGV within the map as the UGV advances, according to indications received from a positioning system, such as a Global Positioning System (GPS). However, GPS measurements may be inaccurate and may suffer from jitter and delayed updates. In an area dense with obstacles, such inaccuracies may be harmful as they may cause a UGV to get to dangerous proximity or even collide with an obstacle. For example, GPS based location may erroneously indicate a safe distance from an obstacle, while the real distance may be much smaller.

According to other methods, tracking the location of the UGV is done by using an INS based on the readings of the IMU. However, such tracking may account for significant errors resulting from accumulated drift as the UGV advances, which may also lead to dangerous or other undesired situations.

Figure 3:
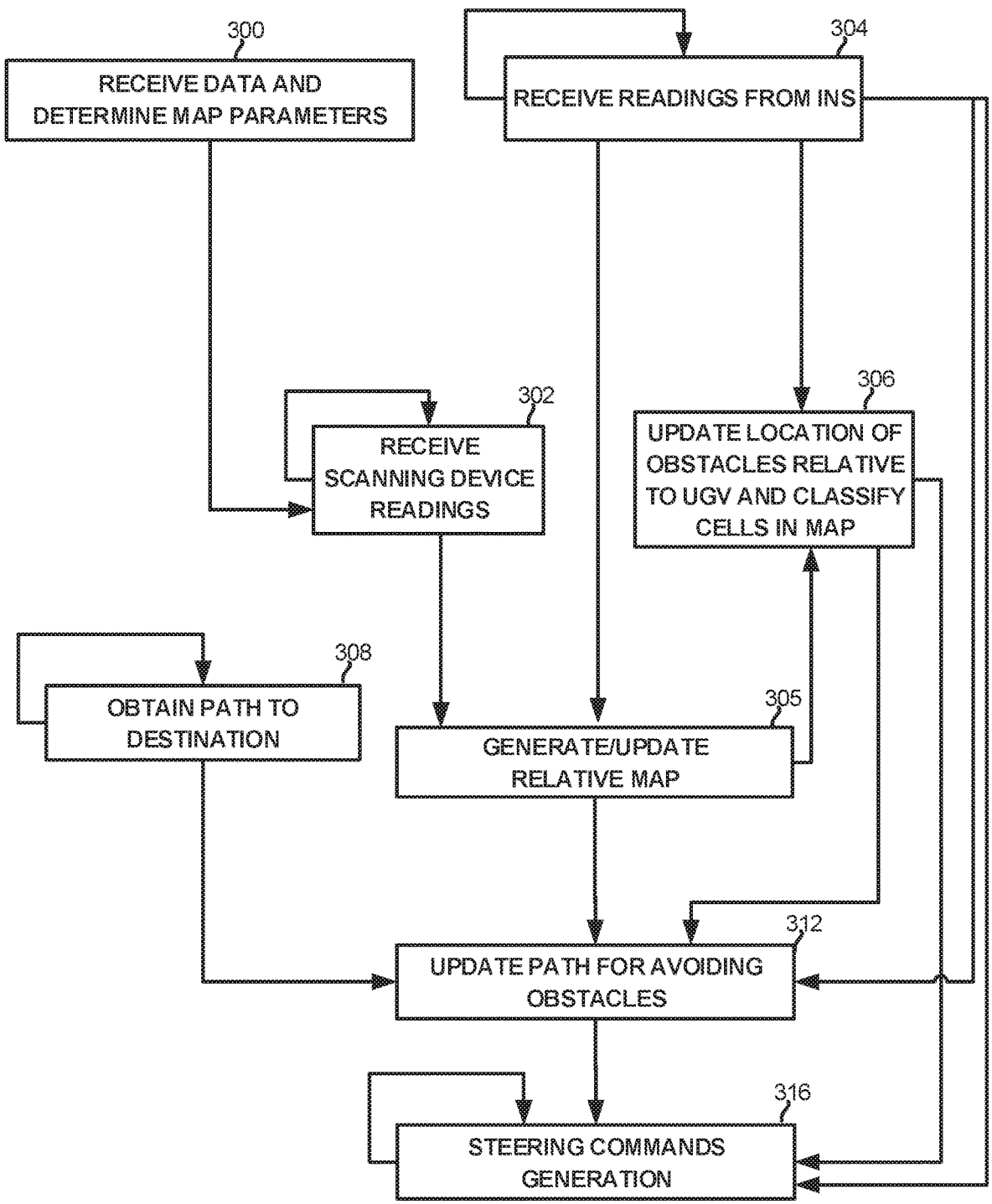
FIG. 3 illustrates a generalized flow-chart of a method for navigating a UGV in the presence of obstacles, in accordance with certain examples of the presently disclosed subject matter.

Reference is now made to FIG. 3, showing a flowchart of operation for navigation within an area. Operations are described below with reference to elements in FIG. 1, however this is done by way of example only and should not be construed as limiting.

In some examples, information including data characterizing the area to be traversed, as well as the operational parameters of UGV 100 and navigation system 102, is received (block 300). For instance, processor 124 can receive (300) such information at the onset of vehicle navigation. For example, this information may include, but is not limited to, the size or location of the area to be traversed, obstacle density, UGV maximal or average velocity within the terrain, scanning distance, scanning angle (360° or less) and scanning resolution (every 1°, 2°, etc.) of one or more scanning devices comprised by the UGV, or the like. In some example, processor 124 can be configured to determine map parameters of the relative map, such as the size of the area represented by each map, map cell size, or the like, as detailed below. It will be appreciated that in some examples, the relative maps representing the area surrounding the UGV, are square or substantially square (i.e. with some disparity between the lengths of the different edges of the map, e.g. less than 10% difference or less than 5% difference or less than 2.5% difference, etc.). However, in other examples, the map may be rectangle, or have some other shape.

At block 302 data is received from a scanning device, (e.g. scanning device 104 depicted FIG. 1). The scanner is operated to scan an area around the vehicle (perform a scanning operation) as the vehicle travels through the area and generate scanning output data, comprising readings of distances from the UGV to objects in any direction and transmit the scanning output data to a computer processor (e.g. processor 124). The scanner is operated to provide the readings repeatedly, at a rate depending on the device capabilities, user settings, or the like. The readings may be received for a full cycle (360°) around the device, or for a smaller angle, such as 180°, 270°, or the like. The readings may be received at a predefined resolution, such as every 0.5°, every 1°, every 2°, or the like, horizontally and vertically. It will be appreciated that scanning output data may be received from multiple scanners operatively connected to the UGV, which may be combined for generating the map.

At block 304, readings are received from INS 110 (e.g. received by processor 124), indicating a current location of the UGV relative to a previous location. The readings may be provided by INS 110 at a rate depending on the capabilities of INS 110, user settings, etc.

At block 305 a relative map of the area of the UGV is generated or updated based on the scanning output data and on the INS data, (e.g. by processor 124 executing relative map generation/updating module 128). It will be appreciated that the map is initially generated based upon scanning output data received from scanner 104 and INS data received from INS (which includes location and orientation of the UGV at the time of scanning) after which it can be updated based on further scanning output data or on UGV location data calculated based on data from INS. Thus, the map may be updated when new readings are received from scanner 104, or when the relative location of the UGV has changed in response to new data received from the INS. In addition to orientation, location of the vehicle obtained from INS is needed in order to determine the position of the UGV relative to previous map (e.g. relative to the north) and enable the accumulation of maps generated over time.

The scanning device reading (scanning output data) generated by the scanner is processed to identify objects and terrain outline and a corresponding map (referred herein also as "initial map") is generated based on the processing output. According to some examples, the height of various objects in the scanned area surrounding the UGV may be determined based on the readings in various vertical directions, thus providing 3-dimensional information for generating a 3-dimensional map. In other examples, e.g. in order to save resources, a 2.5 dimensional map may be generated and used, as mentioned above. The generated map (e.g. 3-D or 2.5-D map) provides a real-time picture of the environment surrounding the UGV from the vantage point of the scanners located on-board the UGV.

According to some examples, the map can be generated and updated such that it is centred around the UGV and the locations of obstacles in the area of the UGV are indicated relative to the UGV. It will be appreciated that map generation may also utilize information obtained from other sources, such as existing roads, areas that can or cannot be traversed, information obtained from image analysis, information indicating whether certain objects are obstacles or not, or the like.

According to one example, the size of the area represented by the map can be determined in accordance with the range and accuracy of the scanning device. For example, a scanning range of 35 m in each direction with accuracy appropriate for the terrain and task, provides for a map representing a square having an edge of double the scanning distance, i.e. 70 m. It will be appreciated, however, that the size of the area may be determined in accordance with additional or different parameters, such as the size of the area to be traversed, the scanning range and precision of the scanning device, INS drift, or other factors. According to some examples the size of the area is in the order of magnitude of tens of meters, such as 10 m to 200 m in each dimension (e.g. longitudinal and lateral In some examples, given a certain size of the edge of the map (assuming for example a map substantially square), the scanner provides readings of the area around the UGV which are used for defining a circumcircle around the square of the map (i.e. inner map). Then a circumgon square (outer map) may be defined for the circumcircle with an edge that equals about 1.41 the edge of the inner square. Initially the outer map (which includes the inner map) is oriented with the north. The inner map (e.g. a horizontal egosphere map) can then be turned, within the area of the outer map, so it is orientated with the heading of the UGV for the convenience of the users (e.g. operators of the vehicle or path planners).

According to the subject matter disclosed herein, the map is divided into a grid of cells, wherein each cell represents part of the map area. In one example, division of the map into cells can be performed as part of the map generation process (described with reference to block 305). In another example, the division can be performed as part of the classification process described herein below (with reference to block 306). As explained in more detail below the size of the cells dividing the map is determined based on INS drift over a certain predefined distance.

At block 306, the mapping data undergoes a classification process (e.g. by processor 124 or by some other dedicated processor) that includes identification of obstacles within the mapped area. Once available, the information regarding obstacles in the mapped area is used for classifying the cells dividing the map. Various methods for identifying obstacles in a scanned environment based on scanned output data are known in the art. For convenience, the map generated based on the scanning output data as described above with reference to block 305 can be referred to as "initial map" and the term "integrated map" can be used to refer to the initial map after it has been divided into cells classified as traversable or non-traversable cells. The map data of both the initial map and the integrated map and their continuous map updates can be stored in data storage device (e.g. 120).

Following identification of obstacles within the mapped area, cells dividing the area are classified to one of the at least following classes: non-traversable cells (i.e., representing an area comprising an obstacle or part thereof); and traversable cells (i.e., representing an area not comprising an obstacle or part thereof). Cells encompassing obstacles are classified as non-traversable while cells which are empty of obstacles are classified as traversable. In some examples, a cell may also be classified as unknown.

It will be appreciated that initially all cells can be classified as unknown. As the UGV gets closer to areas represented by unknown cells, their class may become clear and they can then be classified into traversable or non-traversable. Additionally, in some examples determining whether an area represented by a cell with unknown class is traversable or not, can be based on the specific, progression path, task to be performed, traversability of the vehicle, type of terrain, or the like.

Thus, while different UGVs travelling in the same area may generate an identical or very similar initial map of the area, each UGV may generate a different integrated map or maps as it may classify different objects and areas within the mapped area as obstacles, depending on its specific progression path(s), its traversability, and so forth.

Figure 4A:
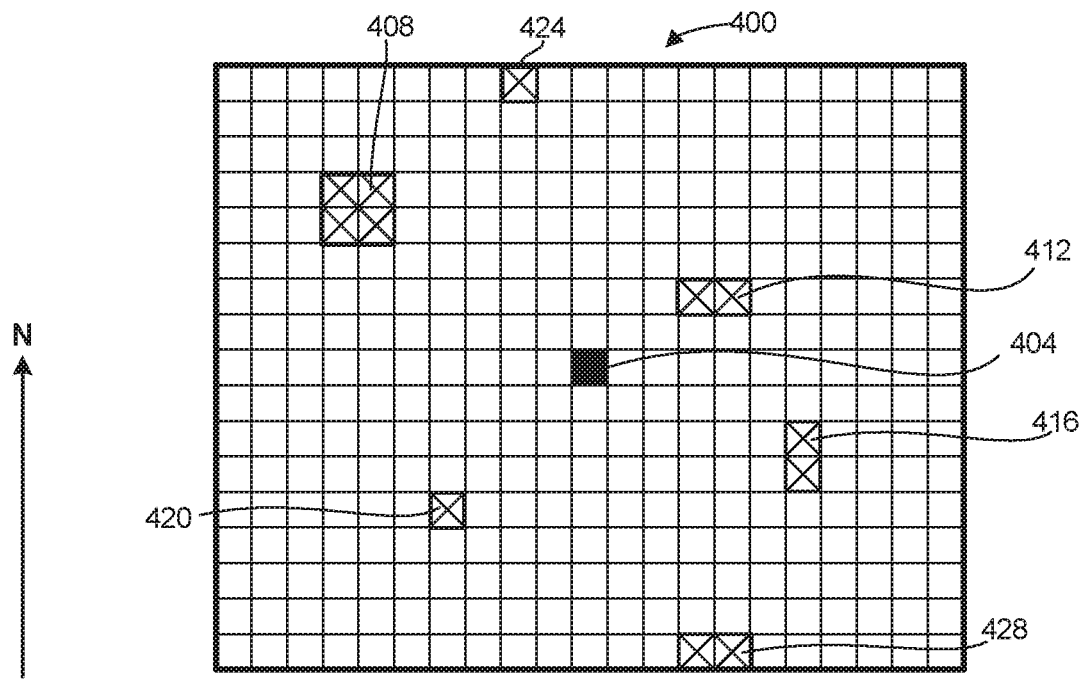
FIG. 4A and FIG. 4B illustrate visual representations of a map of an environment at two points in time, in accordance with certain examples of the presently disclosed subject matter.
Figure 4B:
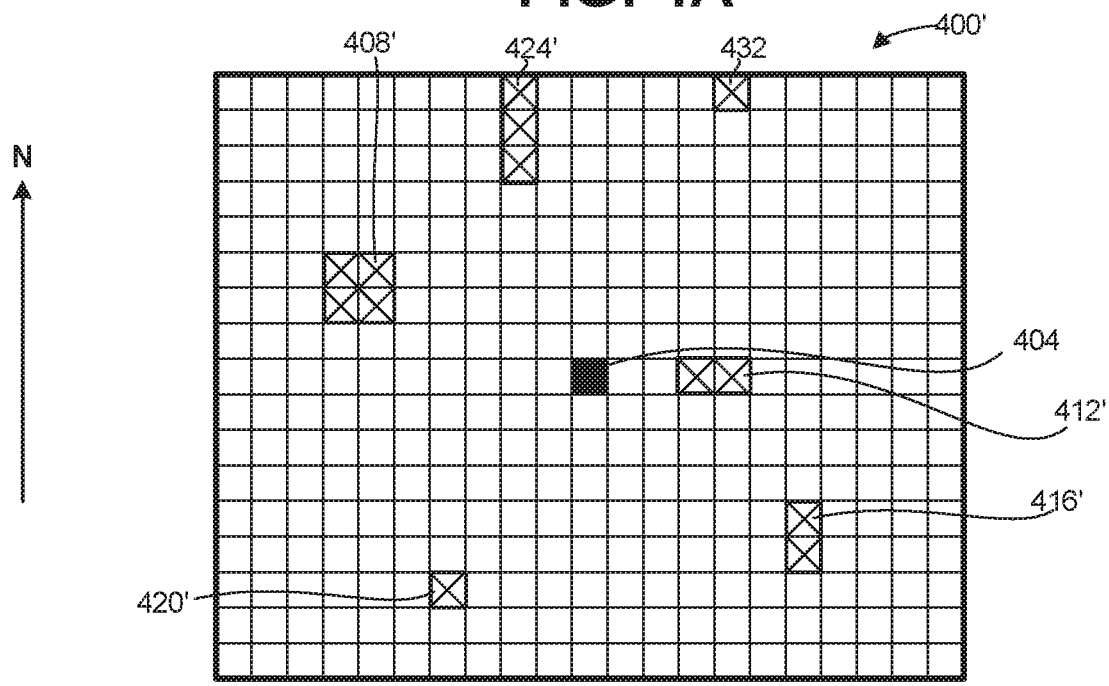

Reference is now made also to FIGS. 4A and 4B that illustrate visual representations of maps of an environment at two points in time, to demonstrate how the relative map is generated and updated as the UGV advances, in accordance with some embodiments of the disclosure. As mentioned above, the maps can be generated/updated (for example by processor 124, e.g. by relative map generating/updating module 128) based on scanning output provided by scanning device 104 and INS data received from INS 110.

FIG. 4A shows 2D map 400 representing the scanned area at a particular time $t_1$, and FIG. 4B shows 2D map 400', which represents the scanned area at a later time $t_2$. According to the illustrated example, between $t_1$ and $t_2$ the UGV moved to the north a distance represented by two cells of the maps. Thus, map 400' represents an area which has significant overlap but is more northerly relative to the area of map 400. Black square 404 indicates the UGV and is located in both maps at the center of the map, but due to the movement of the UGV to the north between $t_1$ and $t_2$, the obstacles have moved south relative to the UGV. Thus the obstacles represented in map 400' as areas 408', 412', 416' and 420' are shown more southerly as compared to areas 408, 412, 416 and 420 in map 400. The obstacle represented by area 428 of map 400 is not represented in map 400' since it is located in the southern area of map 400 which is not included in map 400'. The obstacle represented by area 424 in map 400, on the other hand, is represented by area 424' wherein a larger part of it is shown in map 400', and area 432 appears at the northern part of map 400'. It will be appreciated that positive and negative obstacles are not depicted differently since both types represent area cells which are non-traversable and which the UGV needs to avoid. Notably Notably, although obstacles remain at the same locations and the UGV moves relative to the environment, the maps are created relative to the UGV. The maps thus represent the UGV at the same location within the maps while the obstacles are moved in the opposite direction to the direction of movement of the UGV.

As explained above the map is divided into a grid of cells, which are classified to at least one of the at least following classes: non-traversable cell (i.e., representing an area comprising an obstacle or part thereof); and traversable cell (i.e., representing an area not comprising an obstacle such that the UGV is unable to enter the area or should avoid it for some other reason).

A cell is classified in accordance with the classification of the corresponding area it encompasses within the map. In some examples, an obstacle or any part thereof located within the area of cell, renders the entire cell non-traversable. The entire area of a cell may thus be classified as non-traversable even if an obstacle detected within the area represented by the cell covers only a part of the cell's area, e.g., the size of the obstacle or obstacles or part thereof located within the area represented by the cell is smaller than the entire area of the cell. Therefore, a cell classified as traversable ensures that the area represented by the cell is free of obstacles. As exemplified in FIGS. 4a and 4b all obstacles cover complete cells, i.e. the entirety of each cell is either an obstacle (i.e. non-traversable) or not an obstacle (i.e. traversable).

According to examples of the presently disclosed subject matter, the size of the cells in the map is selected to equal or exceed the maximal accumulated drift of the INS over some distance.

Thus, the cell size provides a safety threshold that protects against navigation errors resulting from INS drift. Larger cells provide for wider safety thresholds, and thus provide for a smaller chance of hitting an obstacle due to erroneous determined vehicle position resulting from the drift. Notably, as the cell size is related to the specific drift of the INS, cell size may differ depending on the specific type of INS which is used and its corresponding drift. Given a certain distance, a more accurate INS allows to use smaller cells as it has less drift over the distance.

The distance upon which the maximal accumulated drift is determined, can be for example, a dimension, such as the edge size of the area depicted by the map. Alternatively, in a different example the distance may be half of the edge size of the area depicted by the map, which is relevant when the UGV is located at the center of the map and can thus travel half the edge size of the area before exiting the mapped area and entering an area of a new/updated map generated based on a more recent scanning output. According to another example the distance can be the length of a diagonal crossing the area of the map from one point (vertex) to an opposite point (vertex), which equals in a square shaped map to about 1.41 times the edge length.

When selecting the cell size to be larger than the maximal drift over the distance of half the size of the area represented by the map ensures that the vehicle can advance until the edge of the area represented by the map without colliding with an obstacle. For example, assuming the map size is 70 m by 70 m, a drift of one degree over half the length of the map (35 m) amounts to about 61 cm, (35*tan(1)=0.61). Therefore, if a cell size larger than 61 cm is selected, the presence of an obstacle or part thereof in a cell, makes that cell non-traversable cell, even if the obstacle or part thereof is smaller than 61 cm. In some examples, cells may be square, but in other embodiments they may have other shapes such as rectangular, in which case the size of each dimension of the cells relates to the maximal drift along the relevant direction over a determined distance.

When cell size is determined in accordance with the map update rate, and the maximal or expected velocity of the UGV a distance which the UGV traverses between consecutive map updates can be derived and from that the drift of the INS over that distance. The map update rate relates to the scanning rate of the scanner, and the time required for generating the map based thereon, keeping in mind that small cells incur a heavier computational burden. Generally, as the map update rate increases or the velocity decreases, smaller cells may be used.

In further examples, the cell size may be determined in accordance with a ratio between the map size squared expressed, for example, in square meters, and the velocity of the UGV, expressed, for example, in meter per second, multiplied by the INS drift, expressed for example in radian per second.

The fact that an entire cell is classified as non-traversable irrespective of the actual size of the obstacle(s) located within the area of the cell together with the fact that the size of the cell is greater than a maximal accumulated INS drift over a given distance, protects from collision with obstacles which may result from INS drift over the given distance. The accumulated drift over the given distance can induce a navigation error which is smaller than the size of a cell but not greater. Thus, as a result of such error the UGV may deviate from its actual location only within the boundaries of a cell. Since a traversable cell is completely clear of obstacles, deviation within the boundaries of a cell does not pose a risk of collision with an obstacle.

As mentioned above, according to some examples of the presently disclosed subject matter the relative map can be created and updated in an accumulative manner, in which readings are gathered as the UGV advances into the area. Initially, scanning data of areas beyond the scanning range of the scanner, or too close to the scanner, for example in the range of 5 m from the scanner in each direction, is not available for scanning. As the UGV advances, a map of the full area surrounding the UGV, and within the scanning range, becomes available. Once a map of the full area that can be represented by the map is available, the map is updated as new areas are being scanned, as the UGV advances towards these areas. However, peripheral areas in the direction opposite the advancement direction are excluded from the maps as they are being updated.

In some situations, objects may appear or disappear between consecutive map updates. Disappearance of objects may be due for example to the geometry of the UGV and the topography of the scanned areas near the UGV. In other situations, object disappearance may be due to noise, or due to scanning at different angles. For example, one scan may include readings along odd angles (e.g., 1°, 3°, etc.) relative to some direction, while the following scan may include the even angles (e.g., 2°, 4°, etc.). Newly appearing objects can be indicated as non-traversable cells on the newly generated map. In some situations, objects that have disappeared can still be represented as non-traversable cells in one or more further updated maps. For example, when objects are scanned from some distance, and then disappear as the UGV gets closer to the objects, the objects may be assumed to remain at their location and are indicated on the map, and may later reappear once the UGV advances further. The locations of such objects relative to the UGV may be determined in accordance with the received INS data, indicating the change in location of the UGV since the last map update.

Optionally, in order to save computation time and resources, or due to scanner limitations or area topography, part or all of previously scanned areas are not re-scanned, or the scanning information related to these areas is not processed as consecutive maps that include representation of these areas are generated. Rather the information related to these areas, obtained during previous scans, is maintained and used while updating the map.

As detailed below, the UGV advances in accordance with a map updated using data received from INS 110 and from the scanning device, and can thus avoid obstacles.

Referring now back to FIG. 3, at block 308, a path to a desired destination to which the UGV has to arrive may be obtained. The path may be calculated by processor 124, or received from an external source via a communication module communicating for example over an RF network. A path may be received in the form of way points or advancement instructions.

The path may be determined so as to avoid obstacles indicated by non-traversable cells. The path determination may also take into account dangerous objects as determined from a 2.5-dimension map, for example steep or otherwise dangerous slopes. Path determination may also take into account objects such as ramps. Ramps may constitute a traversable slope when accessed from one or more directions, for example the ascending or descending direction, and a non-traversable obstacle when accessed from the side, in which direction the ramp constitutes a dangerous slope.

The path determination, if required, can include obtaining relative or absolute coordinates of the current location of the UGV and of the destination, and calculating a path therebetween, using any path planning method that is currently known or will become known in the future. The path can include one or more way points through which the UGV has to pass along the path. The path calculation may take into account also data such as existing roads which are to be used or the like. The path calculation can also take into account locations to be avoided such as existing roads which may be damaged by the UGV.

In some embodiments, the path can be calculated in association with a destination which is relative to the current location of the UGV. The destination can be obtained by manually or automatically searching and identifying a predetermined sign indicating the target destination. The predetermined sign can be, for example, a pointer emitting visible or invisible light, a location in which a predetermined gesture is performed by a person or a machine, or the like.

It will be appreciated that the mentioned options are provided by way of example only and any other method of obtaining a target and determining a path from the current location to the destination can be used instead.

At block 312, once an updated map is available, parts of the progression path that are within the area represented by the map can be updated (e.g. by processor 124 executing path updating module 136) so as to avoid obstacles and dangerous slopes. It will be appreciated that if no obstacles exist in the surroundings of the UGV, for example if the cells representing areas expected to be traversed until the next reading, as received from the scanning device, are indicated as traversable, then the path may be used as is, without updates.

It will be appreciated that some objects represent an obstacle when accessed from one side, but not when accessed from another side. For example, a ramp represents an obstacle when accessed from the side of the ramp, but not when accessed from the front or from the back. Thus, according to some examples, identification of obstacles in the map is dependent on a specific progression path of the UGV. Given a certain progression path within the generated map, it is determined whether the UGV can traverse the mapped area along that path. According to some examples, the UGV can simulate a plurality of possible progression paths leading from its current position to a desired location and identify within the mapped area, for each simulated path, the respective obstacles of that path.

Furthermore, where multiple progression paths are simulated, classification of the cells to non-traversable and traversable can be repeated for each of the simulated paths. Thus, the identification of obstacles and classification of cells accordingly can occur as the UGV advances through the area once the progression path or the simulated progression paths are known in real-time.

As the identification of obstacles and classification of cells into traversable cells and non-traversable cells is dependent on the specific progression path of the UGV, in some examples, pronounced obstacles which can be easily initially detected (at block 306) and other obstacles which depend on the specific progression map are identified together with the generation/update of the progression map described with reference to block 312.

At block 316, vehicle control sub-systems 112 can repeatedly generate steering commands to steer the UGV in accordance with the available map along the path as determined. While at block 312 the integrated map (block 306) is used for generating or updating a progression path, at block 316 the integrated map can be used during steering of the vehicle in order to avoid collision with obstacles while proceeding along the progression path which has been determined at according to block 312.

In some examples, when the UGV is driven by a driver who cannot see outside the vehicle, instead of providing steering commands, a map with indications of the non-traversable cells, the location of the UGV, and the path to be taken may be shown to the driver, and the driver can steer the vehicle in accordance with the map. For example, the map may be displayed on a display device, and updated whenever updated readings from the scanning device are available, the UGV location is updated based on the INS reading, or a new path is obtained.

In some embodiments, INS readings may be received more often than scanner readings. Since the map is generated based on the scanner readings, the same map may be used a number of times, wherein the cells and the steering instructions are updated in accordance with the INS readings which provide updated information.

It will be appreciated that any two or more of the cycles of obtaining the destination or the path, receiving the scanning device readings, receiving the INS data and generating steering commands, may or may not be synchronized. By way of a non-limiting example, the destination or path may be obtained every 10 milliseconds or more, e.g., 100 milliseconds. However, in some tasks, for example when communication is unavailable, the destination or path may be updated every few minutes or even less frequently. By way of a non-limiting example, the scanning device readings may be obtained every 10-500 milliseconds, e.g., 25 milliseconds, and the IMU readings may be obtained every 2-50 milliseconds, e.g., 20 milliseconds. Steering commands may be issued for example at 2-20 Hz.

Thus, the order in which the steps of the flowchart of FIG. 3 are performed may change, for example they may be interleaved or executed concurrently, and is not limited to the order as shown.

It is noted that the teachings of the presently disclosed subject matter are not bound by that described with reference to FIG. 3 and the components described with reference to FIG. 1. Equivalent and/or modified functionality can be consolidated or divided in another manner and can be implemented in any appropriate order or combination of software, firmware and hardware and executed on a suitable device.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of navigating an unmanned ground vehicle (UGV), comprising an Inertial Navigation System (INS), the method comprising:
   operating a scanning device onboard the UGV for repeatedly executing a scanning operation, where each scanning operation includes scanning an area surrounding the UGV to thereby generate respective scanning output data;
   operating at least one processor for generating, based on the scanning output data from a plurality of scanning operations, a map representing at least a part of the area, the map being relative to a location of the UGV and is characterized by a certain size, wherein the map comprises cells, each of the cells is classified to a class selected from at least two classes, comprising traversable and non-traversable, and characterized by dimensions equal or larger than an accumulated drift value of the INS over a predefined distance; wherein non-traversable cells correspond to obstacles;
   receiving INS data indicative of a current location of the UGV relative to a previous location; and
   updating a location of the UGV relative to cells in the map based on the INS data.

2. The method of claim 1, further comprising controlling movement of the UGV within the area based on the map and the location of the UGV relative to the cells determined based on the received INS data, in order to avoid non-traversable cells.

3. The method of claim 1, wherein INS data is received repeatedly.

4. The method of claim 1, wherein the map is initially generated by accumulating scanning output data to map the area as the UGV advances into the area.

5. The method of claim 1, wherein the map is generated by accumulating scanning output data in an advancement direction of the UGV as the UGV advances into the area, and omitting representation of areas in an opposite direction beyond a scanning range.

6. The method of claim 1, further comprising:
   while navigating the UGV along a path leading to a destination using at least one navigation means other than INS,
   navigating the UGV within an area represented by the map while avoiding non-traversable cells, based on the map and the INS data, wherein an INS drift-induced error within the area of the map is limited by the dimensions of a cell in the map, thereby updating the path so it avoids obstacles.

7. The method of claim 6, further comprising determining the path to the destination, the path is determined so as to avoid non-traversable cells based on the map and providing steering instructions to control the UGV in accordance with the path.

8. The method of claim 6, further comprising receiving a current location of the UGV and a destination location in absolute coordinates, and wherein the path is determined based on the current location and the destination location.

9. The method of claim 1, wherein the predefined distance is selected to exceed a maximal distance expected to be travelled by the UGV between consecutive map updates.

10. The method of claim 1, wherein the area has predefined area dimensions which are based on a scanning distance of the scanning device.

11. The method of claim 1, wherein the area is a square having an edge of up to double a scanning distance of the scanning device.

12. The method of claim 1, wherein in case an obstacle has been detected during a first scanning operation and indicated on the map as a non-traversable cell and has not been detected in at least one subsequent scanning operation, the method further comprising: determining a location of the obstacle relative to the UGV in accordance with the received INS data indicating the change in location of the UGV since the last map update; and indicating the obstacle on at least one further map update as a non-traversable cell.

13. The method of claim 1, wherein the cells in the map include non-traversable cells that correspond to obstacles detected in scanning output data of one scanning operation and not in scanning output data of a later scanning operation.

14. The method of claim 1, wherein the predefined distance is derived from one or more dimensions of the map.

15. The method of claim 14, wherein the predefined distance is determined according to any one of:
   i. a dimension of the area represented by the map;
   ii. half of a dimension of the part of the area represented by the map; and
   iii. a diagonal of the map.

16. A system mountable on an unmanned ground vehicle (UGV), the system comprising:
   a scanning device configured to repeatedly execute a scanning operation, where each scanning operations includes scanning an area surrounding the UGV, to thereby provide scanning output data that includes information about distances between objects in the area and the UGV in a multiplicity of directions;
   an Inertial Navigation System (INS) for providing data indicative of a current location of the UGV relative to a previous location; and
   at least one processor is configured to:
      generate, based on the scanning output data from a plurality of scanning operations, a map representing at least a part of the area, the map being relative to a location of the UGV, wherein the map comprises cells, each of the cell is classified to a class selected from the group consisting of traversable and non-traversable, and characterized by dimensions equal or larger than an accumulated drift value of the INS over a predefined distance; wherein non-traversable cells correspond to obstacles;
      receive INS data indicative of a current location of the UGV relative to a previous location; and
      update a location of the UGV relative to the cells based on the INS data.

17. The system of claim 16, further comprising a vehicle control sub-system configured to control UGV movement within the area based on the map and the location of the UGV relative to the cells determined based on the received INS data, in order to avoid non-traversable cells.

18. The system of claim 16, wherein the at least one processor is configured to is receive INS data repeatedly.

19. The system of claim 16, wherein the at least one processor is configured to initially generate the map by accumulating scanning output data to map the area as the UGV advances into the area.

20. The system of claim 16, wherein the at least one processor is configured to generate the map by accumulating scanning output data in an advancement direction of the UGV as the UGV advances into the area, and omit representation of areas in an opposite direction beyond a scanning range.

21. The system of claim 16, wherein the at least one processor is further configured to:
while navigating the UGV along a path leading to a destination using at least one navigation means other than INS, navigating the vehicle within an area represented by the map while avoiding non-traversable cells, based on the map and the INS data, wherein an INS drift-induced error within the area of the map is limited by the dimensions of a cell in the map, thereby updating the path so it avoids obstacles.

22. The system of claim 21, wherein the at least one processor is further configured to receive a current location of the UGV and a destination location in absolute coordinates, and wherein the path is determined based on the current location and the destination location.

23. The system of claim 21, wherein the at least one processor is further configured to provide steering instructions to control the UGV in accordance with the path.

24. The system of claim 21, wherein navigating the vehicle within an area represented by the map is done without using GPS.

25. The system of claim 16, wherein the predefined distance is selected to exceed a maximal distance expected to be travelled by the UGV between consecutive map updates.

26. The system of claim 16, wherein the area surrounding the UGV is characterized by predefined area dimensions and wherein in case an obstacle has been detected during a first scanning operation and indicated on the map as a non-traversable cell and has not been detected in at least one subsequent scanning operation on at least one further map update, the at least one processor is configured to determine a location of the obstacle relative to the UGV in accordance with the received INS data indicating the change in location of the UGV since the last map update; and indicate the obstacle as a non-traversable cell on the map.

27. The system of any one of claim 16, wherein a dimension of each cell is determined in accordance with the dimension of the area squared, divided by a velocity of the UGV and multiplied by the drift value of the INS.

28. The system of claim 16, wherein the cells in the map include non-traversable cells that correspond to obstacles detected in scanning output data of one scanning operation and not in scanning output data of a later scanning operation.

29. An unmanned ground vehicle (UGV), comprising the system according to claim 16.

30. The system of claim 16, wherein the predefined distance is derived from one or more dimensions of the map.

31. The system of claim 14, wherein the predefined distance is determined according to any one of:
i. a dimension of the area represented by the map;
ii. half of a dimension of the part of the area represented by the map; and
iii. a diagonal of the map.

32. The method of claim 6, wherein navigating the UGV within an area represented by the map is done without using GPS.

33. A computer program product comprising a computer readable storage medium retaining program instructions, which program instructions when read by a processor, cause the processor to perform a method of navigation of a vehicle, the method comprising:
receiving scanning output data, generated by a scanning device located on-board the vehicle operable to scan an area surrounding the vehicle;
using the scanning output data from a plurality of scanning operations, for generating respective mapping data representing at least a part of the area, the mapping data being relative to a location of the vehicle, wherein the mapping data comprises cells, each cell is classified to a class selected from at least two classes, comprising traversable and non-traversable, and characterized by dimensions equal or larger than an accumulated drift value of an Inertial Navigation System (INS) over a predefined distance; wherein non-traversable cells correspond to obstacles; and
receiving INS data indicative of a current location of the vehicle relative to a previous location; and updating a location of the vehicle relative to the cells based on INS data.

34. The computer program product of claim 33, wherein the predefined distance is derived from one or more dimensions of the map.

35. The computer program product of claim 33, wherein the method further comprises:
while navigating the UGV along a path leading to a destination using at least one navigation means other than INS,
navigating the vehicle within an area represented by the map while avoiding non-traversable cells, based on the map and the INS data, wherein an INS drift-induced error within the area of the map is limited by the dimensions of a cell in the map, thereby updating the path so it avoids obstacles.

36. The computer program product of claim 35, wherein navigating the vehicle within an area represented by the map is done without using GPS.

* * * * *